United States Patent [19]

Austin

[11] Patent Number: 4,932,810

[45] Date of Patent: Jun. 12, 1990

[54] CORROSION PROTECTION SYSTEM FOR A PIPELINE CROSSING

[75] Inventor: Ricky D. Austin, Kingfisher, Okla.

[73] Assignee: Conoco Inc., Ponca City, Okla.

[21] Appl. No.: 411,763

[22] Filed: Sep. 25, 1989

[51] Int. Cl.5 .............................................. F16L 1/02
[52] U.S. Cl. .................................. 405/157; 405/154; 405/184
[58] Field of Search ....................... 405/154, 157, 184; 138/97; 137/67, 70; 175/61, 62, 73, 53

[56] References Cited

U.S. PATENT DOCUMENTS

| | | |
|---|---|---|
| H594 | 3/1989 | Adorjan . |
| 2,237,680 | 12/1937 | Mark . |
| 2,816,575 | 12/1957 | Stokes . |
| 2,896,669 | 7/1959 | Broadway et al. ............. 405/184 X |
| 3,410,313 | 11/1968 | Martin . |
| 3,430,484 | 10/1965 | Wittgenstein . |
| 3,649,034 | 3/1972 | Barton . |
| 3,862,349 | 1/1975 | Watts ............................... 405/157 X |
| 4,469,469 | 9/1984 | Kennedy ......................... 405/184 X |
| 4,653,541 | 3/1987 | Oehlschlaeger et al. . |
| 4,724,857 | 2/1988 | Taylor .............................. 137/70 X |
| 4,787,409 | 11/1988 | Taylor .............................. 137/70 X |

*Primary Examiner*—Dennis L. Taylor
*Attorney, Agent, or Firm*—John E. Holder

[57] ABSTRACT

In a pipeline crossing, a carrier pipeline is annularly surrounded by a casing with the ends of the casing vented to the surface and sealed with the periphery of the pipeline to minimize corrosion of the pipeline wall. Access and pressure relief valves are provided on the casing vents at opposite sides of the crossing. This permits purging of the casing injecting an inert gas under pressure into the casing annulus through the valve equipped vents to provide a protective fluid, and periodically monitoring the gas pressure. The gas is maintained at a low pressure which is substantially less than the pressure of product materials within the pipeline.

21 Claims, 2 Drawing Sheets

CORROSION PROTECTION SYSTEM FOR A PIPELINE CROSSING

BACKGROUND OF THE INVENTION

1. Filed of the Invention

This invention relates to a corrosion protection system to be employed on a pipeline crossing and more particularly to a method and apparatus for sealing a cased carrier pipe and introducing an inert gas into a casing annulus about the carrier pipe.

2. Description of the Prior Art

It has been for many years the common practice in the pipeline industry to protect a pipeline crossing under an obstacle such as a road or a riverbed by providing a casing about the carrier pipe where it passes under the crossing. In such a cased crossing a variety of techniques are used to avoid the corrosion problems associated with electrical current passing between conductive members in the pipeline system. These would include coatings, pipeline wraps, impressed current cathodic protection systems, sacrificial anode systems, to name a few. If in the crossing system the casing and the carrier pipe come into direct contact, a corrosion cell may be set up and at the same time lower the cathodic potential of the carrier pipe near the short, potentially allowing further damage to the pipe.

A typical prior art pipeline crossing system and solution to the problems associated therewith are shown in U.S. Pat. 2,816,575 which describes an apparatus for effecting a water tight seal for the casing pipe ends to prevent ground water carrying alkalines or other harmful salts from entering the casing and setting up direct corrosion or electrolytic action. This system employs a vent open to the atmosphere. One draw back to such an open vent is that moisture in the air comes into the casing annulus though an open vent and may condense on the pipe. This moisture then may become an electrolyte through which external cathodic current can pass from the soil through the electrolyte on to the pipe. The protective cathodic current is dissipated back on to the pipe through this electrolyte resulting in the lowering of protective potentials on the pipe at either end of the casing.

If a pipe is bare or if there is damage to a protective pipe coating that exposes the pipe surface, these bare or otherwise exposed surfaces may be subject to atmospheric corrosion inside the casing. Attempts to eliminate such corrosion have involved the use of dielectric filler or an inhibitor liquid in the annulus, such as a gel. One problem associated with the repair of a road crossing system as in the present application is that of disrupting the use of the carrier pipeline. If removal and replacement of the carrier pipe or cutting of the carrier pipe is required, a great expense is incurred in treating the problem. Therefore, it is important that a remedial system be capable of being retrofitted to the existing cased pipeline crossing if at all possible.

It is, therefore, an object of the present invention to provide a simple and inexpensive pipeline crossing system which can be retrofitted onto a presently installed pipeline crossing and wherein the casing annulus surrounding a carrier pipe is maintained free of electrical leaks between the casing and carrier and further which eliminates the intrusion of moisture into the casing annulus, and still further which permits the escape to the surface through the vent of any product which may leak into other casing annulus.

SUMMARY OF THE INVENTION

With this and other objects in view, the present invention is directed to a pipeline crossing system having a casing surrounding a carrier pipe with the casing annulus at each end of the crossing being positively sealed to hold a protective fluid under pressure within the annulus at a low pressure. Casing annulus vents are provided on each side of the crossing to provide a vent of the annulus at each end to the surface. Each of the vents is provided with a valve for opening and closing the vent lines to the atmosphere.

An installation of the protective system includes opening both of the valves on the vent lines and then introducing a protective fluid into one of the vent lines and continuing such introduction of the protective fluid until substantially all ambient fluids in the crossing such as water and air are purged from the annulus and replaced by the protective fluid. The oxygen content of purged fluids may be monitored at the other vent until a casing annulus is substantially oxygen free. At this point the other valved vent is closed off so that a low pressure is developed on the protective fluid within the casing annulus. The one vent is then closed to hold such low pressure on the system. A non-resetting relief valve is provided on at least one of the vent lines which relief valve will open at a precise predetermined pressure level on the vent line which is greater than the low pressure maintained on the protective fluid.

In one embodiment of this system argon gas is used as the protective fluid and it is maintained at a pressure of 5 psi or less. The relief valve on the vent is then set to open at say 7 psi so that if product fluids begin to leak into the casing annulus and the annulus pressure reaches the precise predetermined level, the valve will open and will remain open regardless of whether the casing annulus pressure recedes below the precise predetermined pressure.

Another feature of the present invention is that the protective fluid is introduced into the vent line which intersects the casing annulus at the highest elevation to aid in the purging of ambient fluids from the system.

DESCRIPTION OF THE PREFERRED EMBODIMENTS

Like characters of references designate like parts in those figures of the drawings in which they occur.

Figure 1:
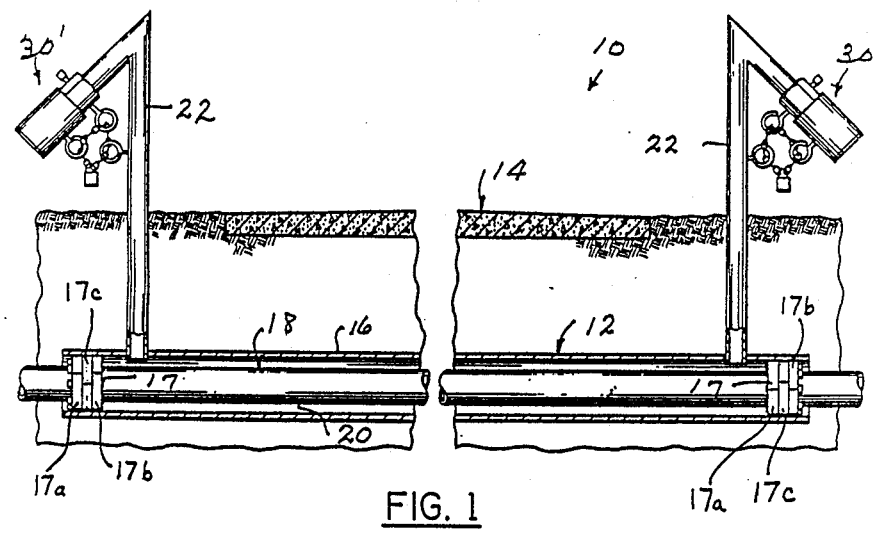
FIG. 1 is a fragmentary vertical cross sectional view of a pipeline road crossing.
Figure 2:
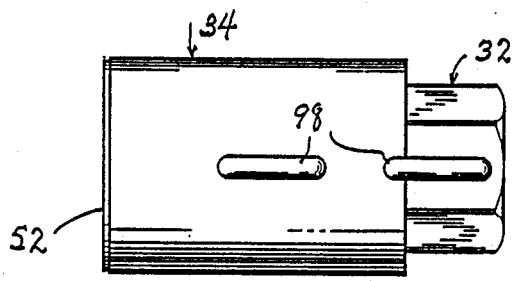
FIG. 2 is an elevational view of the vent closing valves with the valve rotated 90° about it s longitudinal axis from the position shown by FIG. 1.

Referring first to FIG. 1., the reference numeral 10 indicates a typical highway crossing, shown in vertical section, and a typical installation of a carrier pipeline crossing 12 in underlying relation with respect to the highway roadbed 14. The crossing 12 includes an enlarged casing 16 annularly surrounding and sealed, as at 17, at its end portions with the outer peripheral wall of a pipeline carrier pipe 18 to form a gas tight annulus 20 between the casing and pipeline. The seal means 17 is comprised of a pair of segmented plates or discs 17a and 17b which have a central circular opening (not shown) for fitting over the carrier pipe 18. The plates 17a and 17b are constructed of an electrically insulative material such as Nylon ® or other such tough plastic material. An elastomer packer 17c is likewise provided with a circular opening (not shown) and is segmented or otherwise broken at some point so that it may be applied about the pipe 18 without cutting or otherwise disrupting the integrity of the pipe. The packer 17c is positioned with its central opening about the carrier pipe 18 and sandwiched between the segmented plates 17a and 17b to form the seal assembly shown at 17. The horizontal lines on the plates and packer represent cuts in the plates and elastomer packer respectively to show that the members 17a, 17b, and 17c of the assembly are segmented. Typically the segments would be semi-circular. The elastomer packer may be opened at only one place in the annular circle of the packer. Bolts or the like are positioned through plate 17a and threaded into plate 17b to permit the plates to be forced together wherein the annular elastomer packer 17c is squeezed to expand radially outwardly into sealing. Contact with the outer peripheral surface of carrier pipe 18 and the inner wall of casing 16 to thereby seal the casing annulus 20. Such a segmented sealing device although not appropriate for this application, is shown in U.S. Pat. 2,237,680. The seal arrangement for use in this application can be an expandable packer type seal such as shown in U.S. Pat. 3,649,034, entitled "Modular Interwall Seal Unit" to Bruce G. Barton. This modular arrangement of the Barton seal would permit its being retrofitted about a carrier pipe and casing already in place in a pipeline crossing so that it is not necessary to interrupt the flow of product by interrupting the integrity of the carrier pipe 18 as it extends continuously from within and away from the protective casing 16. Although the specific seal shown and described by the Barton patent has been tried in the present application and failed to hold a positive casing annulus pressure, another simpler and more integral seal system has been developed specifically for the present system and is set forth in a copending application Ser. No. 07/353,570 filed on May 18, 1989. This later seal can be retrofitted to the cased crossing without disturbing the use of the carrier pipe and requires no welding or the like. The casing annulus is vented to the atmosphere by conventional tubular vents 22 on opposing sides of the roadbed.

The reference numerals 30 and 30' indicate a valve means for closing the road crossing vents 22. Since the valve means 30 and 30' are identical, only the valve means 30 is described in detail, in the interest of brevity.

Figures 3, 4:
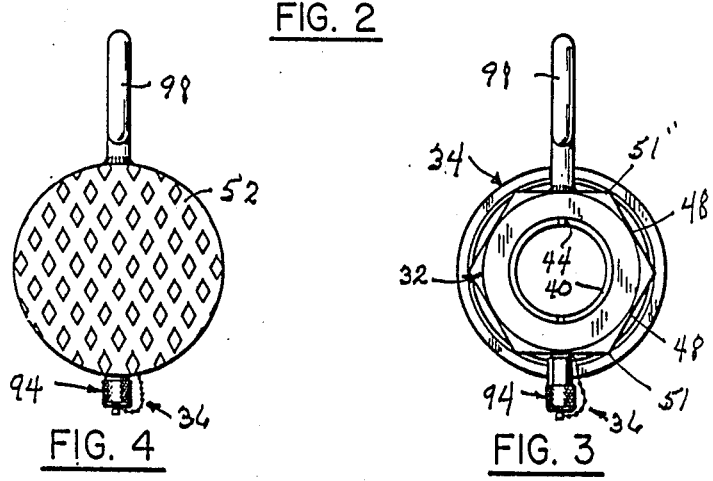
FIG. 3 is a right end elevational view of FIG. 2 with the valve further rotated 90° about its longitudinal axis.
FIG. 4 is a left end elevational view of FIG. 3.
Figure 5:
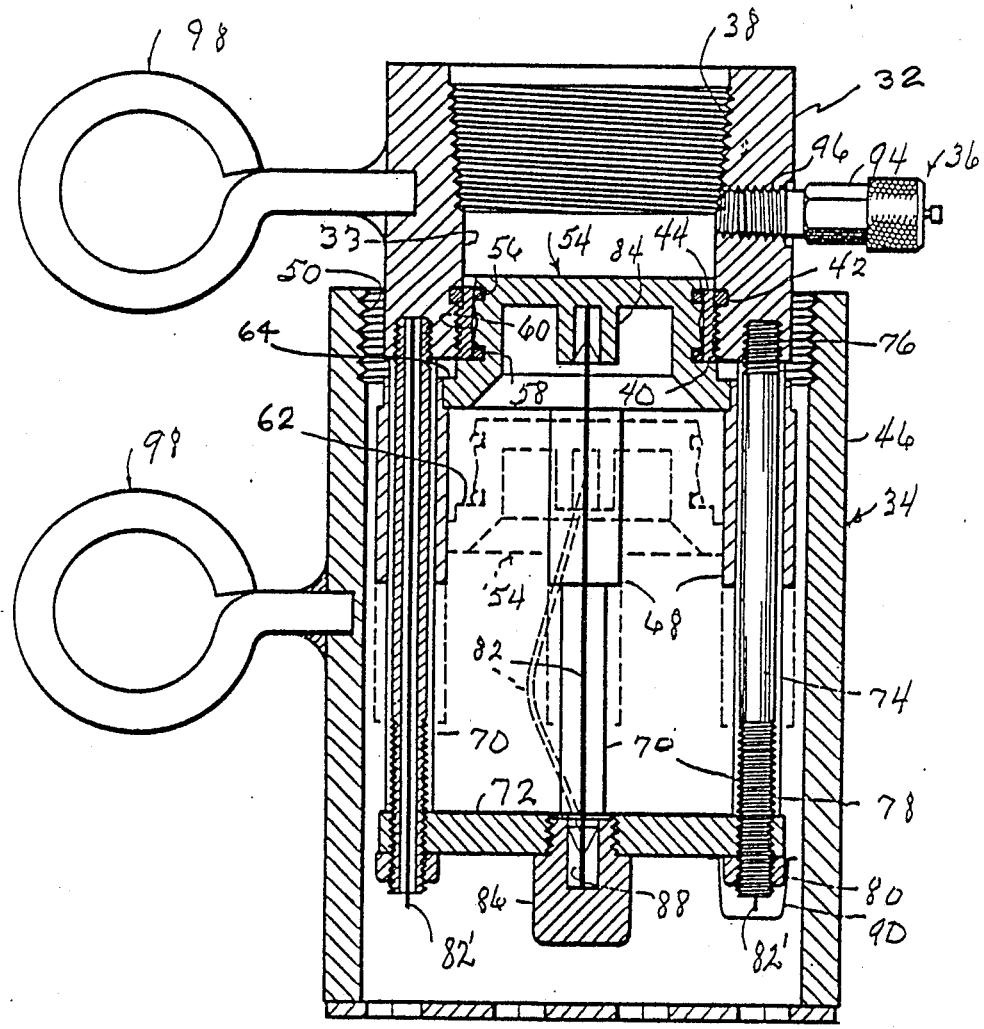
FIG. 5 is a longitudinal sectional view of the pressure relief vent valve taken substantially along the line 5—5 of FIG. 3 and rotated from the position of FIG. 3 to dispose its longitudinal axis vertically.

Next referring to FIGS. 2 to 5, the valve means 30 comprises a hexagonal head portion 32, a sleeve body portion 34, and an access valve means 36, (FIGS. 1, 3 and 5). The head 32 is centrally bored as at 33 (FIG. 5) and threaded as at 38 for connection with the exhaust end portion of the respective road crossing vent 22. The other end portion of the head 32 is provided with a threadedly connected ring-like valve seat 40, having opposing spanner wrench sockets 44, sealed at its inner limit with the head bore 33 by an O-ring 42.

The sleeve-like body means 34 comprises a sleeve 46 which loosely surrounds the flats 48 of the hexagonal head 32. This end of the sleeve 46 is internally threaded as at 50 for threaded engagement with the points 51 (FIG. 3) of the hexagonal head to maintain a rigid coaxial connection between the sleeve 46 and the head 32. The opposite end of the sleeve 46 is provided with a foraminated disc 52 which may be a section of expanded metal.

A cup-shaped piston forms a valve 54 with one end portion closely received in sliding relation by the valve seat 40 and is sealed therewith by longitudinal spaced O-rings 56 and 58. The piston valve seating end portion is circumferentially recessed, as at 60, between the position of the seals 56 and 58 to form a pressure relief space between the seals 56 and 58 in the event of fluid seepage cross the seal 56.

The other or outward end portion of the piston valve is provided with a step diameter flange forming one annular shoulder 62 abutting the outward end of the valve seat 40 and a second shoulder 64 normally disposed in spaced relation with respect to the outward end of the head 32. The piston valve means 54 when seated with the seat 40 thus closes the exhaust end of the road crossing vent 22 for the purposes presently explained.

The sleeve 46 contains a piston valve guide for maintaining the piston valve axially aligned with the head 32 and valve seat 40 when unseated by excess pressure in the road crossing vent 22. This valve guide comprises a plurality (4), only three being shown, tubular guides 68 connected at one end in 90° spaced relationship with the larger diameter of the flanged end of the piston valve 54. These tubular guides 68 slidably surround a like plurality of sleeves 70 in turn closely surrounding a like plurality (4) of bolts 74 extending between the outwardly disposed end of the head 32 and a guide plate 72 axially disposed downstream from the piston valve 54.

One end of each bolt 74 is threadedly connected as at 76 with the head 32 and its other end portion is provided with threads 78 slidably received by the guide plate 72. Nuts 80 on the bolts 74 abut the guide plate 72 against the adjacent ends of the sleeves 70.

As shown by dotted lines (FIG. 5) the piston valve 54 may be moved axially outward, by fluid pressure, against its inward end, toward the foraminated plate 52. During this movement the valve guide is maintained concentric with the valve seat 40 by the guides 68 sliding relative to the sleeves 70.

The piston valve 54 is normally maintained seated with the valve seat 40 by an elongated rod herein called a pin, as shown by the bold line 82 (FIG. 5) extending axially between the piston valve 54 and the guide plate 72. The cup shaped piston valve 54 is provided with a central boss 84 which is centrally bored for receiving one end portion of the pin 82. The guide plate 72 is centrally bored for threadedly receiving a pin support 86 in turn centrally bored to form a cooperating socket 88 receiving the other end portion of the pin 82. The pin 82 is fabricated to yield (bend) in response to a predetermined axially applied pressure.

In the event of a leak in the pipeline 18 under the roadbed, within the casing 16 and between its sealed ends, excess pressure above a predetermined value unseats the piston valve 54 by bending the pin 82, moving the valve 54 toward its dotted line position of FIG. 5. This bending or collapsing of the pin 82 releases excess pressure in the annulus 20 through the threaded end 38 of the head 32. The pin 82 bending at a precise predetermined value thus limits the amount of pressure, to not exceed a predetermined value, within the annulus 20.

The piston valve 54 may be resealed with its seat 40 after being unseated and the problem, if any, has been corrected, by manually removing the sleeve 46, removing the pin nesting socket 86 and manually removing the damaged pin 82. Extra pins 82', only one being shown, are contained by hollow bores formed in the several bolts 74. These extra pins 82' being maintained within the bolts by snap-on plastic caps 90 covering the bolt nuts 80.

The access valve means 36 comprises a vent access valve 94 which is threadedly connected with the head 32 by a threaded bore 96 formed in the wall thereof. The access valve 94 is fully disclosed in my U.S. Pat. No. 3,794,289 and principally comprises a generally cylindrical plug which is centrally bored and provided with O-ring seals, not shown, for receiving an elongated relatively small centrally bored probe such as is disclosed in my U.S. Pat. No. 3,630,080. A quantity of gas, not shown, may be injected into the vent 22 and annulus 20 through either access valve 94 on the valves 30 to pressurize the annulus to a certain value, for example, two and one half pounds above atmospheric pressure. This access valve 94 thus permits charging the casing annulus 20 of the road crossing system with a selected gas as well as permitting a testing of the quantity of gas contained by the annulus 22 by a probe and pressure gauge such as is disclosed by my above mentioned U.S. Pat. No. 3,630,080. As will be described later, the access valve 94 provides a convenient means for monitoring the oxygen content of fluid being purged from the casing annulus through one of the vents 22.

To prevent tampering with or removal of the sleeve means 34, a pair of security ring eyelets 98 are rigidly connected with the wall of the head 32 and sleeve means 34, respectively, for receiving a flexible element threaded through these two eyelets 98 and a companion eyelet 98' rigidly secured to the vertical portion of the vent 22 for receiving a padlock 100.

A typical installation and use of the system described herein is described as follows; If a cased pipeline crossing is showing signs of electrical shorting which would indicate the possibility of electrolytic action within the cased crossing, the procedure of this invention is to expose the ends of the cased crossing. This would normally be accomplished by digging into the earth over each end of the crossing to expose the opening into the annulus at each end of the casing 16. Since it is not likely that the casing annulus is sealed properly to hold a positive pressure within the casing annulus, the old seals (if present) would be replaced by a positive pressure holding seal. Most of the old seals were designed to keep moisture from invading the casing annulus from the earth surrounding the crossing but experience indicates that almost none of the crossings which are investigated have been maintained free of moisture, and it is not uncommon for the annulus to be full of water and mud. In any event, the casing annulus is cleared of any debris such as mud and water as well as possible and is retrofitted with a seal that will hold a gas under a low pressure within the casing annulus. In most cases vent lines to the atmosphere at the surface are provided on the cased crossing but in the event they are not, vent lines usually of 2 inch diameter are connected with the casing annulus to communicate with the interior of the annulus. A precise non-resetting valve such as shown in detail in FIG. 5., is installed in the vent line and is made accessible at the surface similarly to the arrangement of FIG. 1. The access valve 36 on each vent valve 30 is opened and on one of the vent valves 30 the valve piston 54 can be removed to permit maximum purging of the casing annulus. A protective fluid such as argon gas is then introduced into the other vent access valve and the introduction of such protective fluid is continued until the casing annulus is substantially completely purged of any ambient fluids such as water and air to fill the annulus as completely as practically possible with the protective fluid. Argon is an inert gas which satisfies the needs of inhibiting any corrosive or oxidation activity and also has a relatively high molecular weight so that it acts as a good displacement of ambient fluids (primarily water and air) and will further prevent the intrusion of any subsurface fluids into the casing annulus such as by way of seals 17. Other fluids having a weight or density sufficient to displace intruding fluids and which do not support corrosive activity can also be used. Other practical considerations such as toxicity or flammability would also be taken into account when choosing such a fluid. An oxygen analyzer is attached to the discharge vent access valve and the level of oxygen in the fluid being displaced is monitored. If substantially no oxygen is present, the purging process can be considered to have been completed. The discharge vent valve is then closed and the introduction of protective fluid is continued until, for example, two and one half psi is placed on the casing annulus. The introduction of fluid is ceased and the introducing vent line is closed to shut in the casing annulus at the relatively low pressure needed to prevent fluids from the soil from invading the casing annulus. In the example system disclosed herein, the rupture pin valve 30 is then set to fail the pin 82 and thereby open the valve 30 at a pressure of 7 psi. Thus, if product fluids from the carrier pipe 18 should leak into the casing annulus to the extent that the pressure is increased to 7 psi, the rupture valve 30 will operate to open the vent line and is non-resetting so as to remain open even if the pressure within the casing annulus subsides. In this manner any fluids escaping from the product carrier line 18 will be permitted to vent to the atmosphere or perhaps into a vessel (not shown) at the surface, but in no event will escaping fluids be contained within the casing annulus at a pressure above the present precise vent or rupture pressure of the vent valve.

While particular embodiments of the present invention have been shown and described, it is apparent that changes and modifications may be made without departing from this invention in its broader aspects, and therefore, the aim in the appended claims is to cover all such changes and modifications as fall within the true spirit and scope of the invention.

What is claimed is:

1. In a pipeline crossing for passing a product carrier pipe under an obstacle at the earth's surface, means for preventing corrosion of the carrier pipe and for venting fluid from the carrier pipe to the surface in the event of fluid escaping from the carrier pipe in the crossing, comprising:

a casing pipe surrounding the carrier pipe and sized to form an annular space between the casing and carrier pipes;

vent means communicating said annular space with the surface;

seal means at each end of said casing and sealing between the carrier pipe and said casing to form a sealed annulus, said seal means being capable of holding a fluid under pressure in said sealed annulus, said seal means being arranged so that it can be installed in said annular space while said carrier pipe is continuously extending from said casing so that said carrier pipe does not present any interruptions in its integrity at the crossing, said seal means further being capable of being installed about said carrier pipe while said carrier pipe is carrying products therethrough; and non-resetting valve means, serviceable at the surface, for closing said vent line.

2. The apparatus of claim 1 and further wherein said valve means includes an element which will rupture at a precise pressure to communicate the surface of the crossing with said annular space.

3. The apparatus of claim 1 wherein said valve means will normally hold a precise low positive pressure on said sealed annulus and further wherein said valve means will open when said carrier pipe fluid escapes into said sealed annulus.

4. The apparatus of claim 1 wherein said seal means provides a dialectic barrier between the carrier pipe and said casing.

5. In a pipeline crossing having an elongated carrier pipe for carrying fluids under pressure, said carrier pipe passing under the earth's surface in downward vertically spaced relation with respect to an obstacle on the surface and surrounded by a casing sealed near its respective end portions about the periphery of the carrier pipe to form an annulus around the carrier pipe, the casing annulus having a vent line communicating with the surface, the improvement comprising:

seal means disposed in the casing annulus and sealingly engaging the outer wall of the carrier pipe and the inner wall of the casing;

valve means above the surface on the vent line normally closing off the surface end of said vent to said casing annulus, said valve means having means for opening the surface end of said vent to said casing annulus, said opening means including a non-resetting valve means which is arranged to open the surface end of said vent to said casing annulus in the event that fluids from the carrier pipe are communicated with said casing annulus; and means for introducing a gas under pressure into said sealed annulus from the surface, said non-resetting valve means being arranged for precisely maintaining said gas at a pressure substantially less than the pressure of fluids in said carrier pipe.

6. The pipeline crossing of claim 5 wherein said opening means includes a valve body for housing said non-resetting valve means and further wherein said gas introducing means is provided by an auxiliary valve means on said valve body at a place that is in fluid communication with said vent line between said opening means and said casing annulus.

7. The pipeline crossing of claim 5 and further wherein said seal means is arranged for being retrofitted within the ends of the casing annulus when said carrier pipe is being used for carrying fluids through the pipeline crossing.

8. The pipeline crossing of claim 5 and further including an inert fluid in said casing annulus and maintained at a pressure under 10 psi.

9. The pipeline crossing of claim 8 wherein said inert fluid has a molecular weight greater than 30.

10. The pipeline crossing of claim 8 wherein said inert fluid is argon gas.

11. The apparatus of claim 7 wherein said seal means further provides a dialectic barrier between said casing and said carrier pipe for electrically insulating said carrier pipe and said casing.

12. A method for protecting a cased pipeline crossing from the effects of corrosion such crossing having a fluid product carrier pipe annularly disposed within a casing to provide an annular space between the casing and the carrier pipe, comprising the steps of:

providing a positive pressure seal to the annular space at each end of the crossing for holding a fluid under a low pressure within such casing annulus;

venting the casing annulus to the surface;

purging any fluid contained within the casing annulus and vent;

introducing an inert gas into the casing annulus;

maintaining the inert gas at a substantially lower pressure than the pressure of the fluid product in the carrier pipe; and sealing the vent at the surface with a valve which is adapted to open at a pressure higher than the pressure of the inert gas and substantially lower than the pressure of the fluid product within the carrier pipe.

13. The method of claim 12 and further including retrofitting the positive pressure seal into the annular space at at least one end of the crossing without interrupting the flow of product within the carrier pipe.

14. The method of claim 13 wherein the retrofitting step is accomplished by applying segmented sealing members about the carrier pipe within the annular space and by expanding the segmented sealing members into sealing engagement with the outer wall of the carrier pipe and the inner wall of the casing to seal off the annular space.

15. The method of claim 12 wherein said inert gas is maintained at a pressure less than 5 psi in the casing annulus.

16. The method of claim 12 and further including introducing an inert gas having a molecular weight greater than 30 into the casing annulus and maintaining such gas at a pressure below 10 psi.

17. The method of claim 12 and further including;

venting the casing annulus to the surface at each end of the casing;

valving the vents at each end of the casing annulus to permit opening and closing of the vents to the atmosphere at the surface;

opening one of the vents;

introducing an inert gas into the other vent until the casing annulus is substantially completely purged of any fluids other than such inert gas through the one vent;

closing such one vent;

continuing to introduce such inert gas into the other vent until the inert gas is at a low pressure which is substantially less than the pressure of the product in the carrier pipe; and closing such other vent to entrap the inert gas in the casing annulus at such low pressure.

18. The method of claim 17 and further including while the inert gas is being introduced into the other vent to purge the annulus, monitoring the oxygen content of the inert gas as it is escaping through the one vent and closing such one vent when the oxygen content of the escaping gas is substantially reduced to a zero level.

19. A method for protecting a cased pipeline crossing from the effects of corrosion, such crossing having a fluid product carried within a carrier pipe under a pressure which is great enough to move a fluid over great distances at an economic rate through the carrier pipe and further wherein such carrier pipe is annularly disposed within a casing to provide a casing annulus between the casing and the carrier pipe, comprising the steps of:

sealing the annulus at each end of the crossing so that a protective fluid may be maintained within the annulus at a positive pressure;

venting each end of the casing annulus to the surface with a vent line;

valving each of the vent lines to provide a means for opening and closing the vent lines;

opening both of the vent lines;

introducing a protective fluid into one of the vent lines until substantially all other fluids have been purged from the casing annulus through the other vent line;

closing the other vent line;

continuing to introduce the protective fluid into the one vent line until such protective fluid is under a pressure which is substantially less than the pressure of the product in the carrier pipe;

closing the one vent line to entrap the protective fluid under such low pressure in the casing annulus; and providing a non-resetting opening device on at least one of such vent lines which will open such at least one of such vent lines when the casing annulus is exposed to the pressure of the product in the carrier pipe.

20. The method of claim 19 and further including monitoring the oxygen content of fluids being purged through the other vent line, and when the oxygen level has been reduced to a level that indicates that the purging of oxygen is complete, closing the other vent line.

21. The method of claim 19 and further including setting such non-resetting opening device to open at a precise pressure which is greater than the pressure at which such protective fluid is trapped within such casing annulus so that if product fluids are communicated with the casing annulus, the opening device will remain open to communicate the casing annulus with the atmosphere at the surface regardless of what pressure occurs in the annulus after such non-resetting device is opened.

* * * * *